United States Patent
Bray et al.

(10) Patent No.: US 10,346,217 B1
(45) Date of Patent: Jul. 9, 2019

(54) BEST-EFFORT KEY AFFINITY WORKLOAD SHARDING

(71) Applicant: Amazon Technologies, Inc., Seattle, WA (US)

(72) Inventors: Timothy William Bray, Vancouver (CA); Mustafa Ugur Torun, Seattle, WA (US); Soydan Bilgin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 262 days.

(21) Appl. No.: 15/357,927

(22) Filed: Nov. 21, 2016

(51) Int. Cl.
  *G06F 9/46* (2006.01)
  *G06F 9/50* (2006.01)
  *G06F 9/48* (2006.01)

(52) U.S. Cl.
  CPC .......... *G06F 9/5083* (2013.01); *G06F 9/4881* (2013.01); *G06F 9/505* (2013.01)

(58) Field of Classification Search
  None
  See application file for complete search history.

(56) References Cited

U.S. PATENT DOCUMENTS

| | | | |
|---|---|---|---|
| 2013/0283287 A1* | 10/2013 | Lyle | G06F 9/50 718/104 |
| 2015/0215229 A1* | 7/2015 | Xu | H04L 67/1027 709/226 |
| 2015/0237157 A1 | 8/2015 | Wang | |
| 2016/0142475 A1 | 5/2016 | Kathuria et al. | |
| 2016/0203174 A1 | 7/2016 | Shahane et al. | |

* cited by examiner

*Primary Examiner* — Bing Zhao
(74) *Attorney, Agent, or Firm* — Robert C. Kowert; Meyertons, Hood, Kivlin, Kowert & Goetzel, P.C.

(57) ABSTRACT

Devices and processes may perform best-effort key affinity workload sharding. Requests including keys are received at a key based workload manager that applies a consistent sharding algorithm to the keys to select a shard to process the request. For selected shards that are associated with a heavy workload various techniques are performed to iterate though a selection of shards until another shard without a heavy workload is selected. For example, techniques are provided such that for a given request a different shard is selected for each iteration, and shards are selected in the same order for repeated requests with the same key. For keys associated with heavy workloads, shards may be reserved solely for that key. If the techniques fail to find a shard without a heavy workload, a fallback provision may select the shard with the least amount of workload, even if that workload is considered heavy.

21 Claims, 9 Drawing Sheets

BEST-EFFORT KEY AFFINITY WORKLOAD SHARDING

BACKGROUND

The demands on computer systems become larger and larger with ever increasing workloads. One strategy is to divide a workload among a number of computer resources that each perform a portion of the workload. For instance, a workload maybe divided into smaller pieces that are processed individually (e.g., in parallel). Such division of work can process an overall workload that no single computer could manage.

For example, large scale services such as large scale message queuing services, database services, streaming data intake services, and the like rely upon sharding to perform large amounts of data processing. These services may be provided by a network-based service provider (e.g., "in the cloud"), for example.

For various reasons, it may be necessary to divide the workload being processed into portions, for example by association with values of a key, or the like, included in the request (e.g. a key associated with an account number, or a particular customer process, or stored object, etc.) A large number of shards may be used to process the workload. The processing may be expensive, for example database lookups of supporting material for processing based on a key, or the like, included in a request. Caching may be one way to reduce that cost. In at least some distributed load systems, each, or at least many of the shards may be required to maintain cached data associated with the keys which that shard is processing. Furthermore, key-based metrics may need to be gathered from each of the shards that performed processing for that particular key. For all of these reasons, it may be desirable to minimize the number of different portions that are processed by any one shard.

It can be difficult to achieve the desirable goal of both spreading the load across shards while having the same shard process all the requests for a particular key. For example, the overhead associated with tracking and/or routing the various keys for each of the shards may incur overhead costs. Additionally, in some instances, the workload associated with a particular key may be so great as to require more than one shard.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of devices and processes that perform a best-effort key affinity workload sharding technique that selects worker nodes to process requests are disclosed. Generally speaking, sharding may refer to partitioning resources, or groups of resources, into smaller parts, or groups of resources, called shards. Generally, in a system that processes a workload by sharding, it may be desirable to have all the work for some particular portion of the workload sent to the same shard (e.g., all the work associated with a particular account or key may be sent to the shard associated with a worker node, where each worker processes requests for a respective shard). Also, since there may be a much larger number of portions of work (e.g., portions determined by accounts or keys) than shards, techniques such as hashing the key are used to distribute the incoming requests among the shards.

However, it is not unusual for the work associated with a particular portion of the aggregate workload (e.g., the portion of the aggregate workload associated with a particular key) to be much greater than the work associated with another particular portion of the workload. Sometimes, a particular portion of the workload may far outstrip other portions of the workload (e.g., either in the volume of requests associated with that portion, or in the size of the requests associated with that portion of the workload). As an example in a key-based system, the top 10 keys (out of hundreds of thousands, for example) may make up half the total traffic. In another example, a single key may represent more traffic than a shard can handle, or if a few keys associated with moderately-sized workloads hash to the same shard, the aggregate workload may overload that shard, even though there are enough shards in the system to handle the load if they were evenly distributed.

Disclosed are devices and techniques which implement a solution of best effort sharding. In embodiments, the technique does not guarantee that any one portion (e.g., a portion associated with a particular key) will only be processed by one shard, but it will be processed on a relatively small number shards, preferably just enough to process the load, or "good enough" for many types of applications.

At the outset, in order to manage the shards, it may be necessary to determine and/or record the workload of the shards (e.g., the heat or hotness of the shard). By determining the workload, it is possible to determine whether the shard is overloaded. If a selected shard is overloaded, another shard may be selected to process the request, for example.

Worker Node Heatmap

Some combination of one or more techniques may be implemented by a computer system to achieve best-effort key affinity. In the example techniques described below, the techniques may include obtaining and/or maintaining a record of which keys are associated with a heavy workload. For instance, a record of the workload may be kept in a binary form (e.g., "hot" (heavy) or "cold" (light) workload), and/or in a more granular form (e.g., the workload indicated as somewhere along a range of values such as 1 for light workload or 10 for a heavy workload).

Key Heat

In some embodiments, particular portions of the workload (e.g., portions associated with a particular key) may be associated with larger amounts of the workload than other particular portions of the workload. Systems may include a configurable threshold that may be used to reserve shards. For instance, shards may be reserved for keys associated with a portion of the workload that falls above the configurable workload threshold. The reservation may be revoked wen the workload associated with the key drops below the workload threshold, in embodiments.

Key Chaining

For instance, when a unit of work (e.g., a request) for key A is received, the key-based workload manager determines whether the shard associated with that key is under a heavy workload (e.g. is the current workload for that shard too heavy to add more work, or "hot"). If the workload for that shard is too much (e.g., above some configurable work threshold) the key is modified (e.g. a digit added to the key to create "A1") and a new shard determined from the modified key and the workload of the new shard obtained. The key may continue to be modified (e.g., "A2", "A3", etc.) until a shard that is not associated with a heavy workload is found.

Shard Chaining

An example shard chaining technique also includes obtaining and/or maintaining a record of which keys are associated with a heavy workload. In some embodiments of shard chaining, for each unit of work that comes in, the key-based workload manager computes a chain of shard identifiers based on its key and tries to use the shards in the order of the chain. In an example with 100 shards 1 . . . 100, for each available key, a random number generator can be seeded with that key and used to make a permutation of the shards, called a chain. In some embodiments, the shard chains may be generated and cached, instead of generated for each request. The chain may include some or all of the shards, in embodiments. The number of shards in a chain may be expanded as the system grows with the addition of more worker nodes, for instance, the shard chains may be recalculated and cached when worker nodes are added to the system.

In an example, for key "A", the chain might start 33, 11, 84, 51 . . . " and for key "B", the chain might start 91, 84, 3, 52, 34 . . . " When the key-based workload manager receives work for key "A," the key-based workload manager checks the workload for the first shard in the associated chain (33). If the workload is high for shard 33, the key-based workload manager goes to the next shard in that particular chain (11) and checks whether that shard has a high workload and so on until a shard without a high workload (e.g., below some workload threshold) is found. This technique may tend to distribute the work for each key to the same relatively small group of shards, in embodiments.

Shard Reservation

A shard reservation process may be implemented, in embodiments. In this technique, the workload monitor measures which keys are associated with a heavy workload and configures the system such that the keys associated with the heaviest workload each have one or more reserved shards to perform that heavy workload. In some embodiments, a shard that is reserved for a key associated with a heavy workload may not be sent work associated with any other key. In some embodiments of the technique, if all the reserved shards for a key have high workloads, some other technique may be implemented (e.g., key chaining, or shard chaining).

In some embodiments, the reservation manager may be configured to increase or decrease the number of reserved shards. The adjustment may be performed periodically. The adjustment may be performed based on some parameter (e.g., observed workload).

Fallback

In some embodiments, shard workload is tracked as a more granular value (e.g., instead of as a binary value). For instances when the incoming workload continues to be received and all the available shards are under a heavy workload the key-based workload manager may be configured to assign the incoming workload to the shard with the least workload or no workload at all. In some embodiments, it may be determined that the technique (e.g., the key chaining technique, or the shard chaining technique, etc.) is taking too long to settle upon a selected shard without a heavy workload. Under some such circumstances, the key-based workload manager may be configured to discontinue the chaining technique and select a shard with the least workload (e.g., based upon some iteration threshold, for instance).

An example system may run some combination of the above-noted technique(s) in parallel on a large frontend fleet of a service provider. The techniques may be run in parallel without any need for coordination among members of the fleet, in embodiments. For instance, given that load balancers will distribute work substantially randomly and thus substantially equally, the same keys and shards of each worker node should have about the same workload.

Figure 1:
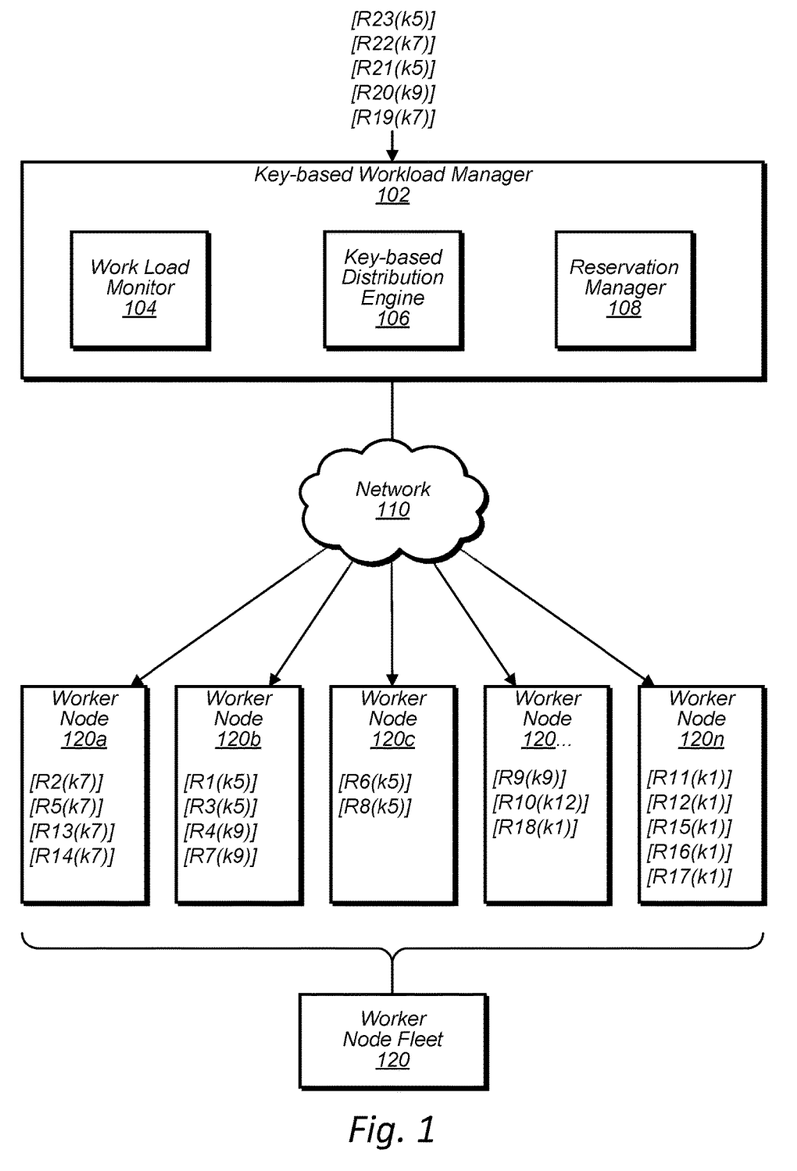
FIG. 1 depicts an example system that processes requests with keys by applying a best-effort key affinity workload sharding technique to select a worker node to process the request, according to at least some embodiments.

FIG. 1 depicts an example system that processes requests with keys by applying a best-effort key affinity workload sharding technique to select a worker node to process the request, according to at least some embodiments. The depicted system includes a key-based workload manager 102 that receives requests that include keys and applies a best-effort key affinity workload sharding technique to distribute the requests to worker nodes 120a-n of a worker node fleet 120.

Various particular techniques (e.g., the processes depicted in FIGS. 2-6A/B) for applying best-effort key affinity workload sharding may be carried out by the depicted key-based workload manager 102. Generally, a workload monitor 104 of the key-based workload manager 102 may be configured to monitor and/or determine workloads associated with the various worker nodes 120a-n. The key-based workload manager 102 depicted in FIG. 1 may include more or fewer components than those depicted, in embodiments.

Workload Monitoring

The system may perform the workload monitoring in a number of various ways. For instance, as depicted in FIG. 1, in a distributed architecture, each key-based workload manager 102 may include a workload monitor 104 that obtains workload data from each of the worker nodes (e.g., in either of a push or pull technique between the workload monitor 104 and the worker nodes 120a-n). In some embodiments, the system may be configured with a centralized workload monitor that obtains workload data from each of the worker nodes (e.g., in either of a push or pull technique between the centralized workload monitor 104 and the worker nodes 120a-n). The key-based workload manager 102 may obtain the workload data from the centralized workload monitor (again, in either of a push or pull technique, but between the centralized workload monitor and the key-based workload managers). Key-based workload manager 102 is depicted with reservation manager 108 that manages reservations of shards for particular keys (described below for FIGS. 6A/6B).

Workload Determination

Techniques for selecting nodes as described herein depend upon the workload of the shards, in embodiments. For instance, a selected shard may be discarded and replaced by another shard if it is determined that the selected shard is overloaded. Determining whether a shard is overloaded or otherwise unsuitable for additional load may be dependent upon nature of the shard. For instance, for shards that process streams of data, the workload of the shared may be determined by tracking the throttled put operations. In another example, for shards that are queue-based, a workload monitor may query the queue depth. Other embodiments that determine the workload of the shards are contemplated and do not depart from the scope of this disclosure. The determined workload may be used in the selection of a particular shard to process the request.

The key-based workload manager 102 depicted in FIG. 1 may be configured to select one of the worker nodes 120a-n (worker nodes may handle the work assigned to a shard, in embodiments) to process a request via application of a consistent sharding algorithm to the key included with the respective request. For different keys, the consistent sharding algorithm may have a random or pseudorandom distribution property that may act to balance the load across the worker nodes, in embodiments. For instance, distinct keys will generally cause the consistent sharding algorithm to select distinct initial shards, in embodiments. If the key is modified, the chain of shards created as the process iterates may be different (e.g., in a random or pseudorandom way) from the chain of shards created for the unmodified key, in embodiments.

In embodiments, the process is iterative, but exhibits characteristics of key affinity (e.g., a next shard is selected only if the current selection is somehow lacking, such as overloaded). Even though the technique attempts to use the same shard for the same key, a different shard is generally selected for each iteration for a given request. Consistency may be provided in that shards are selected in the same consistent shard order for requests with the same key, in embodiments. For instance, for any respective key, the chain of shards that is created from that key is the same each time the chain of shards is created from that key, in embodiments. The process may be considered best-effort in that the technique does not guarantee that any one portion (e.g., a portion associated with a particular key) will only be processed by one shard, but it will be processed by a relatively small number shards, preferably just enough to process the load, or "good enough" for many types of applications, in embodiments. For instance, the system may be configured such that a next shard is selected only if the current selection is overloaded (e.g., too "hot").

For example, as depicted in FIG. 1, a first request associated with a key [R1(k5)] has been received by the key-based workload manager 102 and routed to worker node 120b. A second request with a second key [R2(k7)] was also received by the key-based workload manager 102 and routed to worker node 120a. FIG. 1 illustrates that 18 requests have been processed and assigned to the various worker nodes and that requests 19-23 are pending or arriving at the key based workload manager for distribution.

As depicted in FIG. 1, the keys have been routed in accordance with a best-effort key affinity workload sharding technique manner. The best effort key affinity is illustrated by relatively small number of worker nodes associated with any given key. For instance, key one (k1) is entirely processed by worker nodes 120n/ . . . , and keys five (k5) and nine (k9) are only processed by worker nodes 120b/c and 120b/ . . . , respectively. Key seven (k7) is processed exclusively by worker node 120a. Such exclusivity may be the result of either a best effort key affinity, or a shard being reserved exclusively for a particular key, in embodiments.

Figure 2:
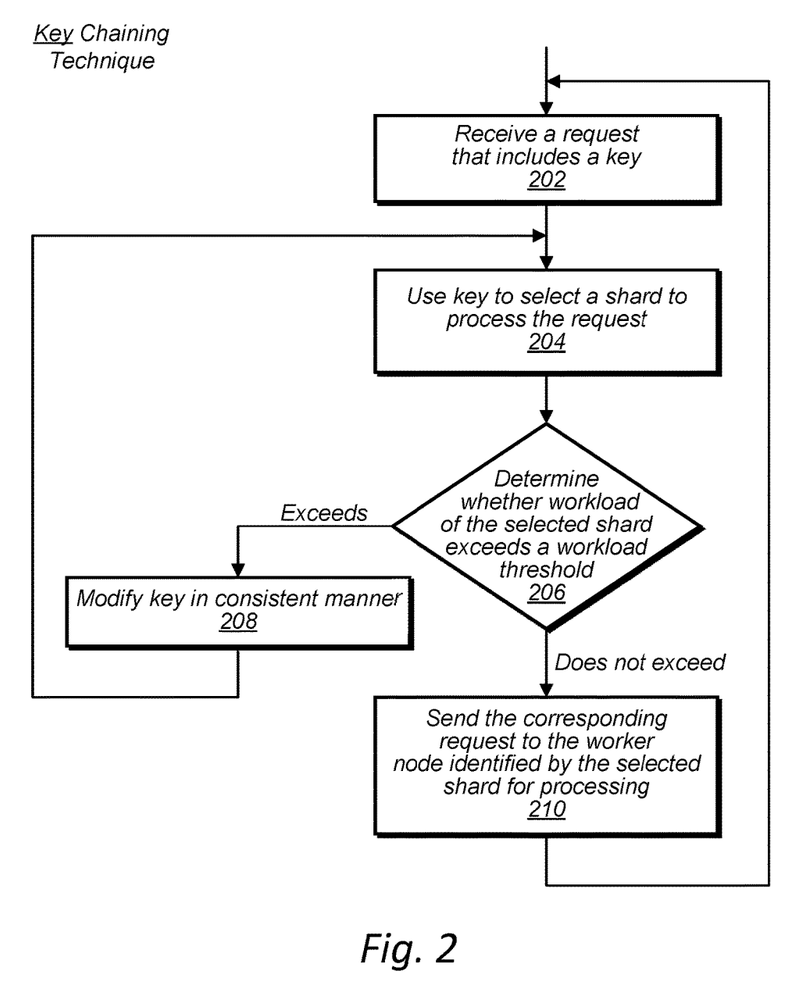
FIG. 2 is a process diagram that depicts a best-effort key affinity workload sharding technique that selects a worker node to process a request, according to at least some embodiments.

FIG. 2 is a process diagram that depicts a best-effort key affinity workload sharding technique that selects a worker node to process a request, according to at least some embodiments. The depicted key chaining technique may be performed by one or more components of the key-based workload manager depicted in FIG. 1, in embodiments. For instance, the key-based distribution engine 106 may be configured to perform steps 202-210 of FIG. 2.

FIG. 2 illustrates that a request that includes a key is received (block 202). For example, the key-based workload manager 102 of FIG. 1 may receive a request with a key (e.g., [R1(k5)]. The key is used to select a shard to process the request (block 204), for example using a consistent sharding algorithm and applying it to the key of the request. For example, the key-based distribution engine 106 applies a consistent hashing function to the key that identifies a shard (e.g., worker node 120b) to process the request. A determination of whether a workload of the selected shard exceeds a workload threshold (block 206). In embodiments, the work load monitor 104 may make the determination based upon whether the selected shard is associated with a heavy workload or not (a binary record). In some embodiments, the determination may be based upon a more granular record of the workload for the selected shard.

In embodiments, the workload may be determined by determining an operational feature of the worker node (e.g., sending the request to worker node, and if the worker node responds by throttling, the workload is determined to exceed a threshold or otherwise be too heavy for that node). A worker node that responds by kicking back the request (e.g., throttling) may be considered hot on a heat map of the worker nodes (under a heavy load), in some embodiments. For a workload that exceeds the threshold (block 206, exceeds) the key from the request may be modified in a consistent manner (block 208). For example, a value may be appended to the key from the request. The process may then return to block 204, where a consistent sharding algorithm is applied to the modified key to select another shard. The algorithm may be consistent in that the algorithm selects shards in the same order for the same key. For instance, the values that are appended to the key in each iteration are appended in the same order for the same key.

For a workload that does not exceed a workload threshold (block 206, Does not exceed) the corresponding request is sent to the worker node identified by the selected shard that has a workload that did not exceed the workload threshold (block 210). For example, the key-based workload manager 102 may send the request [R1(k5)] to worker node 120*b*, as illustrated in FIG. 1. Other combinations and arrangements of the depicted steps are contemplated without departing from the scope of the disclosure.

Figure 3:
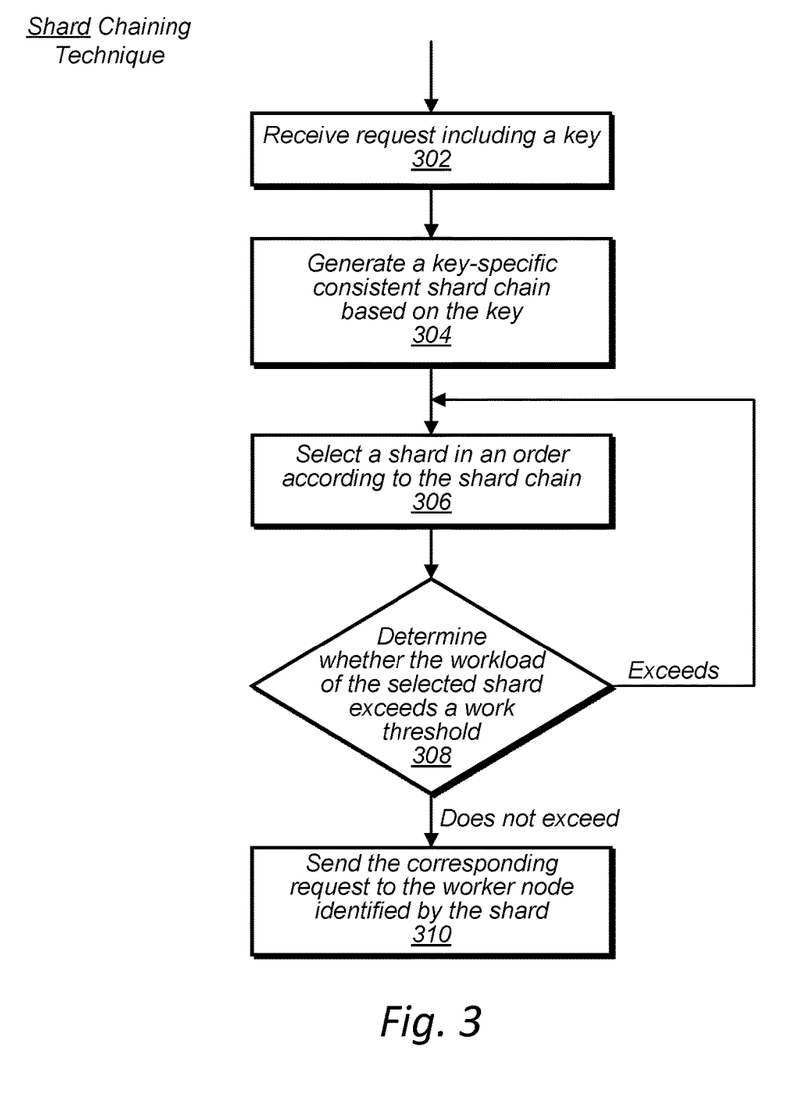
FIG. 3 is a process diagram that depicts another best-effort key affinity workload sharding technique that selects a worker node to process a request, according to at least some embodiments.

FIG. 3 is a process diagram that depicts another best-effort key affinity workload sharding technique that selects a worker node to process a request, according to at least some embodiments. The depicted process (a shard chaining technique) may be performed by one or more components of a key based workload manager 102, in embodiments.

A request that includes a key is received (block 302). For instance, the key-based distribution engine 106 may receive the request from a computer service, a database service or a storage service. A key-specific consistent shard chain is generated (block 304). For instance, the key-based distribution engine 106 can generate a shard chain by seeding a random number generator with the key from the request to make a permutation of the shards called a chain. Shard chains may be generated (e.g., pre-computed before they are needed or upon receipt of the first request including that key) and stored for later reference, or may be generated based on need (e.g., generated each time a request with that key is received), in embodiments.

A shard is selected based on the entries of the shard chain, according to the order of the permutation (block 306), and a determination of whether the workload of the selected shard exceeds a work threshold (block 308). For example, the key-based distribution engine 106 can select the shard and make a request to the work load monitor 104 to obtain the workload of the selected shard and compare the workload to a configurable threshold. In embodiments, the workload may be determined by determining an operational feature of the worker node (e.g., determining the workload by sending the request to worker node, and if the worker node responds by throttling, the workload is determined to exceed a threshold or otherwise be too heavy for that node). The system may cache the operational metrics for the worker nodes and use the operational metrics in the selection of the shards, in embodiments.

If the workload does exceed the threshold (block 308, exceeds) the process may return to block 306 and iterate until a shard with a workload that does not exceed the threshold is selected. For a workload that does not exceed the threshold (block 308, Does not exceed) the corresponding request is sent to the worker node identified by the shard with the workload that does not exceed the threshold. For example, the key-based workload engine 106 may send the request to the worker node of worker nodes 120*a-n* that is identified by the shard with the workload that does not exceed the threshold. Other combinations and arrangements of the depicted steps are contemplated without departing from the scope of the disclosure.

Figure 4:
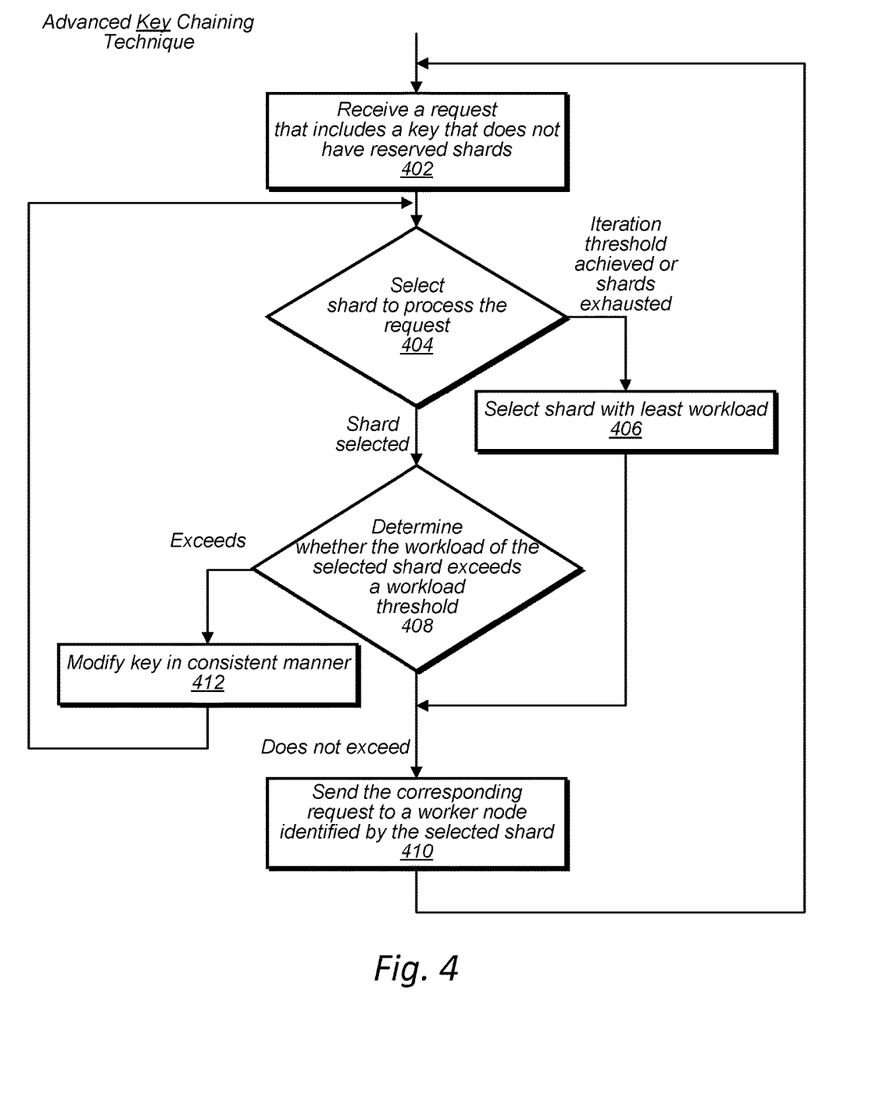
FIG. 4 is a process diagram that depicts another best-effort key affinity workload sharding technique that selects a worker node to process a request, according to at least some embodiments.

FIG. 4 is a process diagram that depicts another best-effort key affinity workload sharding technique that selects a worker node to process a request, according to at least some embodiments. The depicted technique (key chaining with reservation) may be performed by a key-based workload manager (e.g., FIGS. 1,7, items 102*a-n*), in embodiments. The technique illustrated in FIG. 4 is somewhat similar to the technique illustrated in FIG. 2 (key chaining without reservation). In either case, shards may be selected in a consistent manner, that is the selection process follows the same patterns of shards for identical keys, in embodiments (e.g., an identical key may be appended with a value in each iteration, the order of the values being the same for the same key over a number of iterations). While FIG. 4 illustrates a flow in a system without reserved shards, FIG. 6B illustrates a flow that may be combined with portions of FIG. 4 to implement a system with reserved shards, in embodiments.

For instance, FIG. 4 starts off similar to FIG. 2. A request that includes a key that does not have reserved shards is received (block 402), and a shard is selected to process the request (block 404). For instance, a consistent sharding algorithm may be applied to the key to select a shard to process the request. Note that in embodiments of a system with reserved shards, the system may determine whether there are any reserved shards and if the request should be sent to a reserved shard at this point (e.g., see FIG. 6B). A determination is made whether the workload of the selected shard exceeds a workload threshold (block 408). Here, if the workload threshold is exceeded, the key is modified in a consistent manner (block 412). Consistent modification means that when the same key from different requests are modified, they are modified in the same manner (e.g., for identical keys, the modifications create the same modified keys), in embodiments. For example, a consistent modification is appending a particular number to the key. The process then returns to block 404, where the consistent sharding algorithm is applied to the modified key to select another shard. In embodiments, a consistent sharding algorithm produces the same order of selection for different instances of the same key. However, if the workload threshold is not exceeded, the corresponding request is sent to the worker node identified by the selected shard (block 410).

In FIG. 4, a possible exit from the application of the consistent sharding algorithm to the key to select a shard to process the request (block 404) is for an iteration threshold to be achieved or for the available low workload shards to be exhausted. In those cases, the key-based workload manager 102 may select the shard with the least workload to process the request (block 406). Other combinations and arrangements of the depicted steps are contemplated without departing from the scope of the disclosure.

Figure 5:
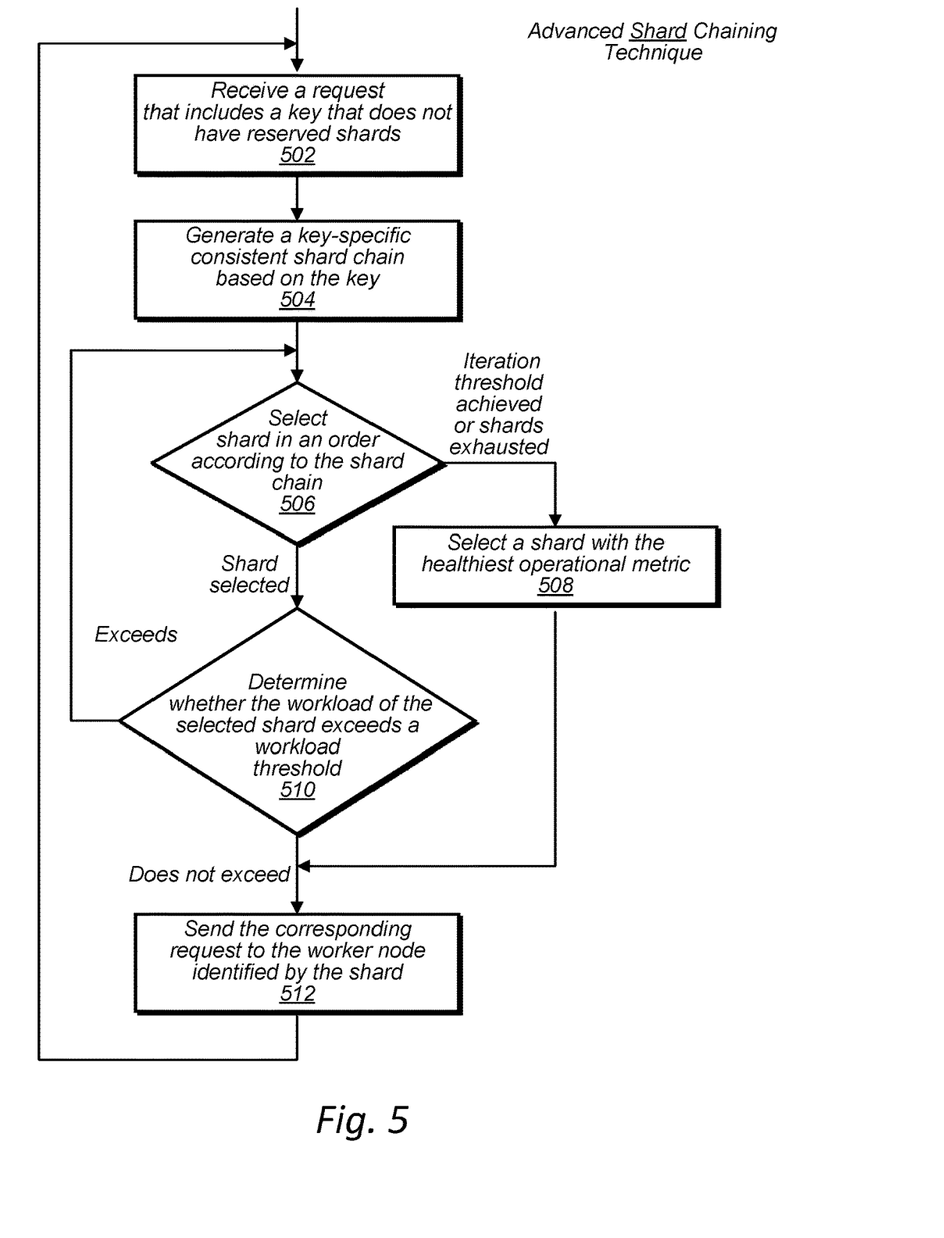
FIG. 5 is a process diagram that depicts another best-effort key affinity workload sharding technique that selects a worker node to process a request, according to at least some embodiments.

FIG. 5 is a process diagram that depicts another best-effort key affinity workload sharding technique that selects a worker node to process a request, according to at least some embodiments. The depicted technique (advanced shard chaining) may be performed by a key-based workload manager (e.g., FIGS. 1, 7, items 102*a-n*), in embodiments. The technique illustrated in FIG. 5 is somewhat similar to the technique illustrated in FIG. 3.

As illustrated, blocks 502, and 504 are similar to the corresponding blocks 302, and 304 of FIG. 3. A request is received that includes a key that does not have reserved shards (block 502). In the depicted embodiment, after a key specific consistent shard chain is generated (block 504) the process moves onto block 506 where the system attempts to select a shard in an order according to the shard chain. However, in a shard chaining technique that includes an iteration threshold or where the shards of the shard chain may become exhausted, one possible exit from the selection step is to select a shard with the healthiest operational metric (e.g., a shard with the least workload, or that is not exhibiting a throttling response, or that has reduced processing capability, etc.) (block 508), when the iteration threshold has been achieved or when all of the low work load shards have been exhausted.

For example, with regard to the iteration threshold, in some systems, the number of entries in a shard chain may be large. Iterating through each of the entries in the shard chain may take more than some desirable time to select a shard. One way to circumvent the shard selection process from taking too long due to too many entries is to set an iteration threshold such that after some number of shards have been considered, the system stops selecting shards in an order according to the shard chain and instead selects the shard with the least workload. Similar logic may be applied for the case when all of the shards in the shard chain have been exhausted without finding a shard without a heavy workload.

At block 510, if the workload exceeds the threshold, the process returns to block 506 to attempt to select another shard. If the workload does not exceed the threshold, the corresponding request is sent to the worker node identified by the selected shard (block 512). Other combinations and arrangements of the depicted steps are contemplated without departing from the scope of the disclosure.

Figure 6A:
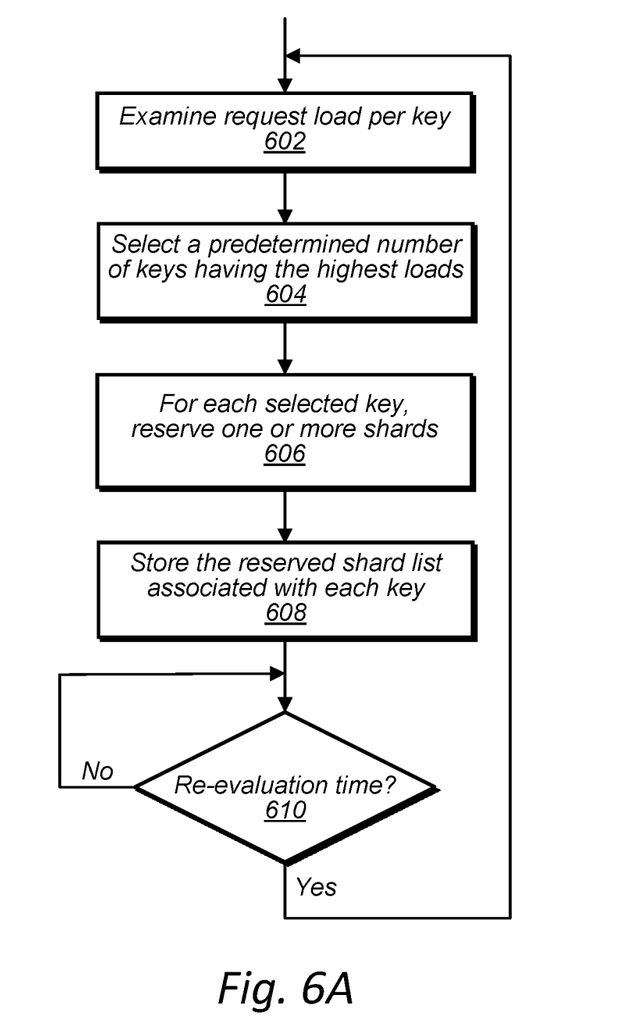
FIGS. 6A/6B illustrate process diagrams associated with automated pre-assignment of reserved shards to a key, and how to handle a request that includes a key associated with a reserved shard, in some embodiments.
Figure 6B:
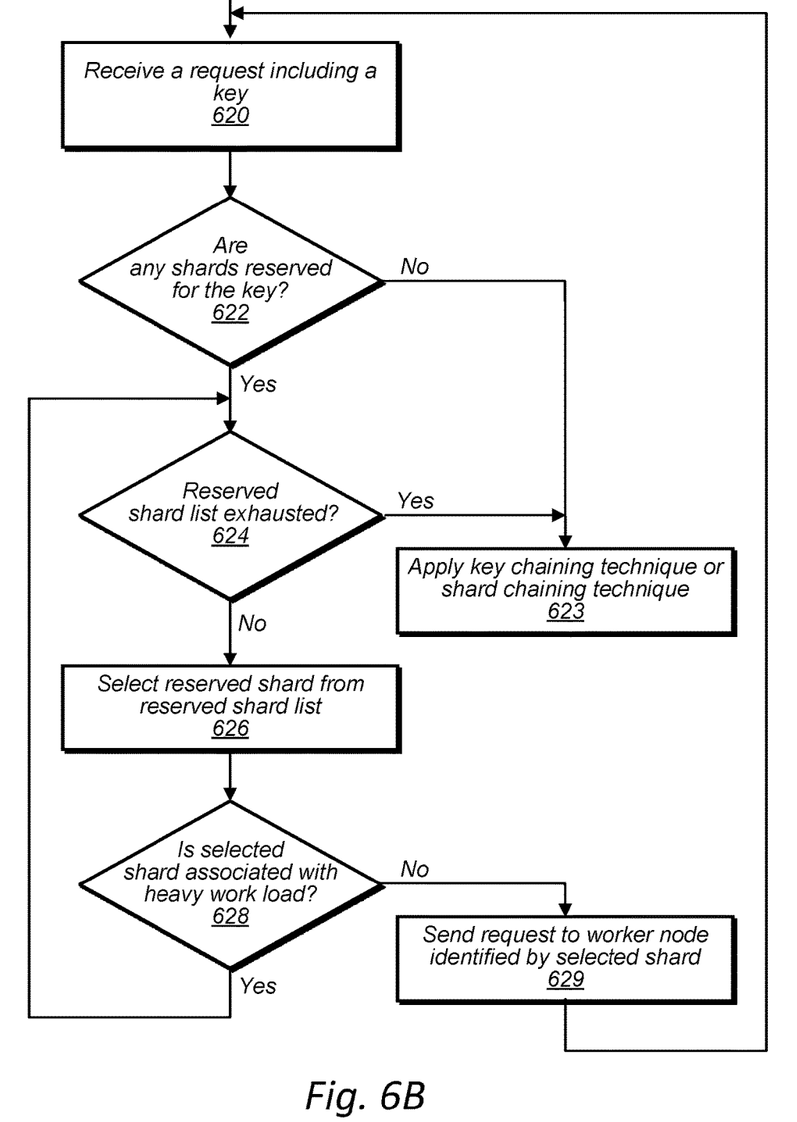

FIGS. 6A/6B illustrate process diagrams associated with automated pre-assignment of reserved shards, and how to handle a request that include a key associated with a reserved shard. The depicted processes may be performed by any of various components of a system that implements best-effort key affinity workload sharding. For instance, steps of the depicted process may be performed by the shard reservation manager 108.

In FIG. 6A, the request load per key is examined (block 602) and a predetermined number of keys having the highest loads are selected (block 604). For instance, an administrator may select the predetermined number and/or the predetermined number may be a configurable parameter. In some embodiments, whether a key is associated with reserved shards may be based upon the workload associated with that key (e.g., is that key above some threshold work load?). Upon iterations of the depicted process, some reservations may be added or dropped. For each selected key, a list of one or more shards is reserved (block 606), and the reserved shard list associated with each key is stored (block 608). For a list of multiple shards, a particular shard may be selected from the list in some random fashion, in embodiments. The list may be a list of one or more shards that are selected in a particular order, in embodiments.

The system may be configured in a number of different ways. For example, in some embodiments, the system may be configured such that the same shard is excluded from appearing on multiple distinct key lists, while in other embodiments, multiple keys can have the same reserved shard. Such a feature may be configurable, in some systems, for example. The process iterates at a re-evaluation time (block 610), in embodiments. For instance, the process may iterate after some configurable period of time or based on an event such as upon a key that is not associated with a reserved node reaching some threshold level workload. Other combinations and arrangements of the depicted steps are contemplated without departing from the scope of the disclosure.

FIG. 6B depicts how to handle a request that includes a key associated with a reserved shard, in embodiments. The steps of the process may be performed by the key-based workload manager 102, in embodiments. For instance, a request including a key is received (block 620) and the system determines whether any shards are reserved for the key (block 622). If no shards are reserved (block 622, no) aspects of either the key chaining technique in FIGS. 2 and 4 or the shard chaining technique from FIGS. 3 and 5 may be applied to select a shard (block 623). For a key that has reserved shards (622, yes) the system may determine whether the entries in the shard list are exhausted (block 624). If exhausted (block 624, yes) aspects of either the key chaining technique in FIGS. 2 and 4 or the shard chaining technique from FIGS. 3 and 5 may be applied to select a shard (block 623).

Otherwise in the case where the reserved shard list is not exhausted (block 624, no) a reserved shard is selected (e.g., randomly in embodiments, or in order in embodiments) from the reserved shard list (block 626) and a determination of whether the selected shard is associated with a heavy workload is made (block 628). For a shard not associated with a heavy workload (block 628, no), the request is sent to the worker node identified by the selected shard (block 629). For a shard associated with a heavy workload (block 628, yes) the process returns to block 624 and the process repeats.

Figure 7:
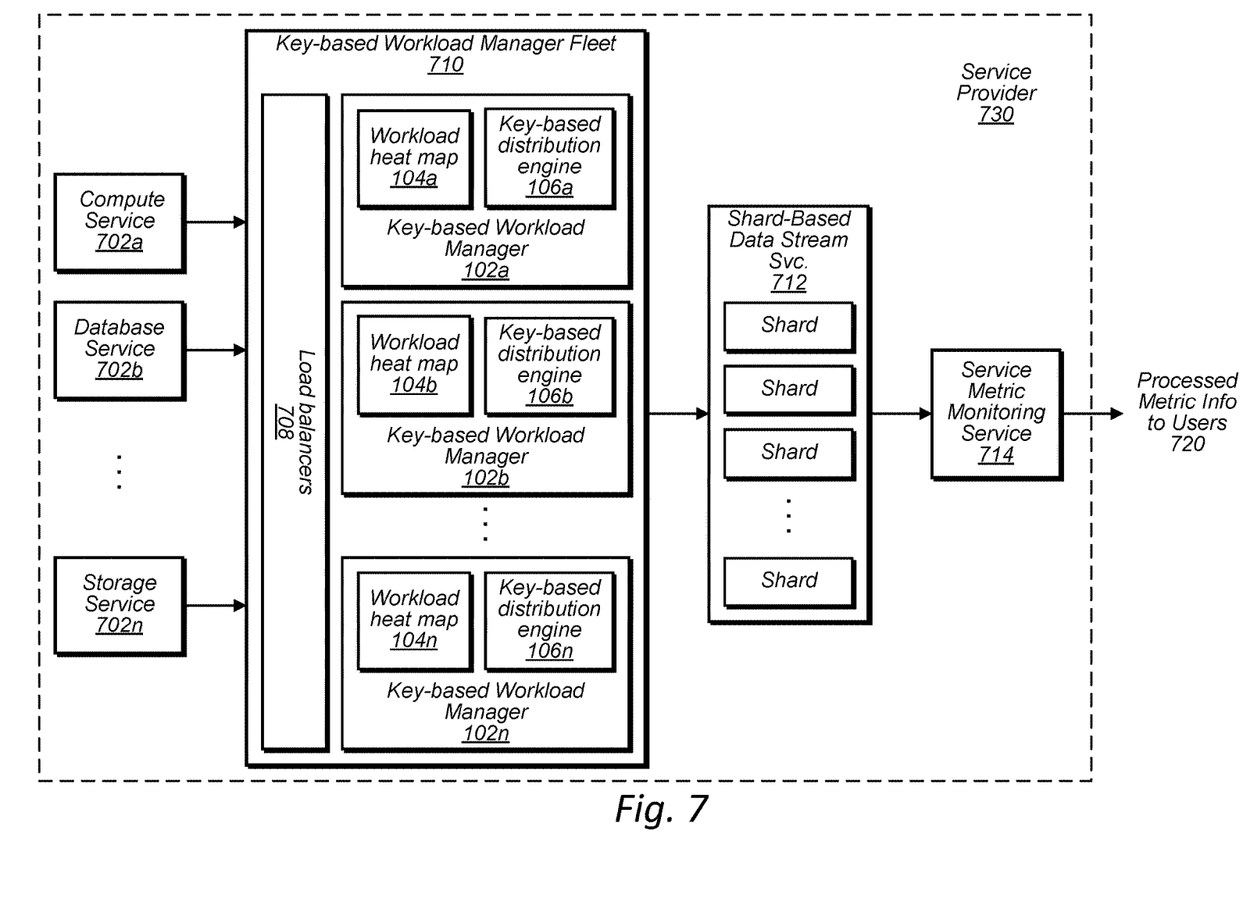
FIG. 7 illustrates a service provider system that processes requests with keys by applying a best-effort key affinity workload sharding technique that selects a worker node to process a request, according to at least some embodiments.

FIG. 7 illustrates a service provider system that processes requests with keys by applying a best-effort key affinity workload sharding technique that selects a worker node to process a request, according to at least some embodiments. The key-based workload managers 102a-n of the service provider may perform the processes illustrated in FIGS. 2-6B, in embodiments.

In FIG. 7, the service provider 730 is depicted as providing a number of provider services (e.g., cloud-based provider services). For instance, the service provider 730 may provide services such as a compute service 702a, database service 702b, storage service 702n, etc. to numerous various customers of the service provider. The compute service 702a may be a scalable cloud computing service, the database service 702b a managed cloud database, and the storage service 702n, a scalable object storage service, for example. The service provider may provide any of various other services without departing from the scope of this disclosure.

In the depicted embodiment, the provider services 702a-n generate and provide various types of data to load balancers 708 that balance the load from the services across a number of key-based workload managers 102a-n. The provider services 702a-n may generate various types of data such as performance data, event data, reporting data, etc. Other examples of data sent from the provider services 702a-n to the fleet of key-based workload managers 710 include IT infrastructure data logs, application logs, social media, billing data, market data feeds, and web click stream data. It may be useful to sort some of these types of data by account, in some systems.

In the depicted embodiment, the fleet of key-based workload managers 710 distribute the data to shards (e.g. a shard identifies a particular worker node) of the shard-based data stream service 712 based on the best effort key affinity workload techniques disclosed herein. The depicted shard-based data stream service 712 performs rapid and continuous intake and aggregation of the data. For instance, individual shards collect and process large streams of data records. The records may be processed in real or near-real time with respect to their receipt from the key-based workload managers 102a-102n. In the depicted embodiment, the shards provide the processed records to the service metric monitoring service 102 (e.g., a network-based service that records API calls for an account and delivers the log files to the account holder, or a monitoring service for cloud-based resources and applications that run in the cloud that collects and tracks metrics, collects and monitors log files, sets alarms, and automatically reacts to changes in cloud-based resources). The service metric monitoring service 102 may read from the streams produced by the shard-based data stream service 712 as data records, in some embodiments. The data may be provided as processed records to dashboards, to generate alerts, to dynamically change strategies (e.g., pricing or advertising strategies), to other services, etc.

All the key-based workload managers know about the workloads for all the shards of the system, in embodiments. The key-based workload managers may not share information (e.g., the workload information) about the shards with other key-based workload managers, in embodiments.

Illustrative System

Figure 8:
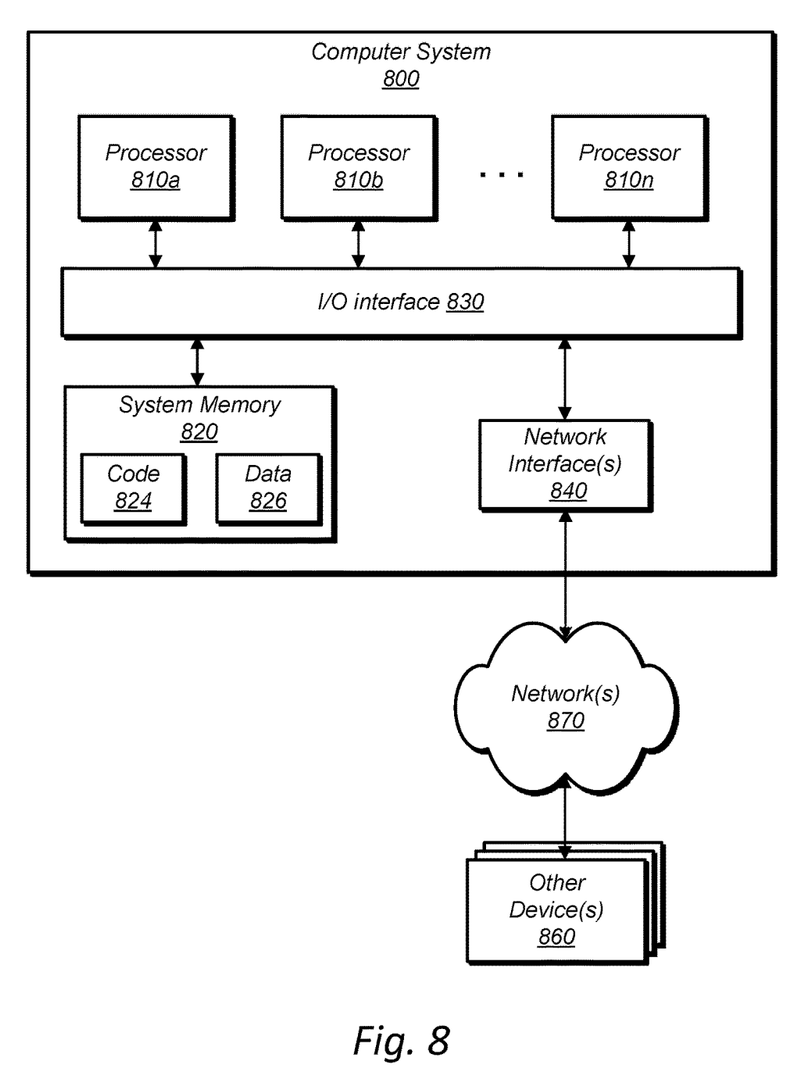
FIG. 8 is a block diagram illustrating an example computer system that may be used in some embodiments.

FIG. 8 is a block diagram illustrating an example computer system that may be used in some embodiments that implement devices and processes that perform a best-effort key affinity workload sharding technique to distribute requests to worker nodes. In at least some embodiments, one or more servers that implement a portion or all of the devices and processes that perform a best-effort key affinity workload sharding technique as described herein may include a computer system configured to be accessed by or receive content from one or more components of a computer system or device such as source entity 120, or recipient entity 130, for example. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for devices and processes that perform a best-effort key affinity workload sharding technique to distribute requests to worker nodes, are shown stored within system memory 820 as code 824 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 950 (e.g., network 110 in FIG. 1), such as other computer systems or devices as illustrated in FIGS. 1-3, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1-7 for implementing embodiments of devices and processes that perform a best-effort key affinity workload sharding technique to distribute requests to worker nodes. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software (e.g., computer-readable program instructions), hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A system, comprising:
a plurality of computers configured to implement:
a plurality of worker nodes configured to process requests, wherein a worker node of the plurality of worker nodes processes requests for a respective shard of a plurality of shards; and
one or more key-based workload managers configured to:
receive the requests, the requests including respective keys;
select one of the plurality of shards via application of a consistent sharding algorithm to the key included with the respective request;
determine whether a workload of the selected shard exceeds a workload threshold;
for a workload that exceeds the workload threshold, repeat said select and said determine to select a next shard according to a consistent shard order for the key until a workload of the next selected shard does not exceed the workload threshold, wherein to select a next shard according to a consistent shard order the one or more key-based workload managers are configured to:
modify the key such that the key is modified in a manner that produces a consistent order of shard selection for requests with the same key; and
select the next shard based on the modified key; and
for the next selected shard that does not exceed the threshold, send the corresponding request to the worker node of the plurality of worker nodes that processes requests for the next selected shard.

2. The system of claim 1,
wherein the one or more key-based workload managers are configured to generate, based at least in part on the key included in the request as a seed to a random number generator, a shard chain that indicates the consistent shard order.

3. The system of claim 1, wherein to select a next shard according to a consistent shard order the one or more key-based workload managers are further configured to:
modify the key according to a key modification pattern; and
apply a hash algorithm to the modified key to select the next shard.

4. The system of claim 1 comprising a plurality of key-based workload managers including the one or more key-based workload managers, wherein individual key-based workload managers of the plurality of key-based workload managers are configured to apply a best effort key affinity algorithm in parallel with and independent of the others of the plurality of key-based workload managers.

5. A computer implemented method, comprising:
performing by one or more computing devices:
receiving requests, the requests including a respective key; and
selecting one of a plurality of shards based at least in part on the key included with the request, wherein a shard identifies a respective worker node of a plurality of worker nodes for handling the requests;
determining whether a workload for the selected shard exceeds a workload threshold;
for a workload that exceeds the workload threshold, repeating said selecting and said determining to select a next shard according to a consistent shard order for the key until a workload for the next selected shard does not exceed the workload threshold, wherein to select the next shard according to a consistent shard order the one or more computing devices perform:
modifying the key such that the key is modified in a manner that produces a consistent order of shard selection for requests with the same key; and
select the next shard based on the modified key; and
sending the request to the worker node identified by the selected next shard having a workload that does not exceed the threshold.

6. The computer implemented method of claim 5,
wherein said selecting one of the plurality of shards includes:
generating, based at least in part on the key included in the request as a seed to a random number generator, a shard chain that indicates the consistent shard order.

7. The computer implemented method of claim 6, further comprising:
subsequent to said selecting one of the plurality of shards, determining that the selected shard is reserved for a particular key different than the key included with the request; and
said repeating is performed until the next selected shard is not reserved and does not exceed the workload threshold.

8. The computer implemented method of claim 7, further comprising for another request including a different key:
selecting one of the plurality of shards based at least in part on the different key;
determining whether a workload for the selected shard exceeds the workload threshold;
repeating said selecting and said determining to select a next shard according to a consistent shard order for the different key; and
performing said repeating for the entire consistent shard order for the different key without finding a shard with a workload that does not exceed the workload threshold,
selecting, from the plurality of shards, a shard associated with the least workload.

9. The computer implemented method of claim 5, wherein said selecting one of the plurality of shards comprises applying a consistent hash function to the key or a modified version of the key to determine the selected shard.

10. The computer implemented method of claim 9, further comprising:
prior to each repeated selection,
appending a different value to the key to create a modified version of the key, wherein the appended value is a different value for the repetition of said selecting and determining such that the key is modified in a manner that produces a consistent order of shard selection for requests with the same key.

11. The computer implemented method of claim 5, wherein said determining whether a workload of the selected shard exceeds a workload threshold includes obtaining, from the worker node identified by the selected shard, an operational metric for the selected shard, and determining whether the workload exceeds a workload threshold is based at least in part on the obtained operational metric.

12. The computer implemented method of claim 5, wherein said determining whether a workload of the selected shard exceeds a workload threshold includes determining the workload for the selected shard based on a throttling response for the selected shard.

13. The computer implemented method of claim 5, wherein said selecting one of the plurality of shards includes selecting one of the plurality of shards via application of a consistent sharding algorithm.

14. A non-transitory computer readable storage medium storing program instructions that, when executed by a computer, cause the computer to:
receive requests, the requests including a respective key; and
for a given one of the requests:
select one of a plurality of shards based at least in part on the key included with the request, wherein a shard identifies a worker node of a plurality of worker nodes for handling the requests;
determine whether a workload for the selected shard exceeds a workload threshold;
for a workload that exceeds the workload threshold, repeating said select and said determine to select a next shard according to a consistent shard order for the key until a workload for the next selected shard does not exceed the workload threshold, wherein to select a next shard according to a consistent shard order the instructions cause the computer to:
modify the key such that the key is modified in a manner that produces a consistent order of shard selection for requests with the same key; and
select the next shard based on the modified key; and
send the request to the worker node identified by the selected next shard having a workload that does not exceed the workload threshold.

15. The non-transitory computer readable storage medium of claim 14, wherein the program instructions further cause the computer to,
generate, based at least in part on the key included in the request as a seed to a random number generator, a shard chain that indicates the consistent shard order.

16. The non-transitory computer readable storage medium of claim 14, wherein to determine whether the workload for the selected shard exceeds the workload threshold, the program instructions further cause the computer to obtain the workload from a centralized work load monitor that obtains workloads from the plurality of worker nodes and distributes the workloads to a plurality of key-based workload managers.

17. The non-transitory computer readable storage medium of claim 14, wherein the program instructions further cause the computer to:
determine, for each of a plurality of keys, a request load that comprises a workload associated with that respective key;
select a predetermined number of keys having the highest request loads;
for selected keys, generate reserved shard lists indicating one or more of the plurality of shards in a defined order;
store the reserved shard lists associated with the keys; and
at a re-evaluation time, repeat said determine a request load, said select a predetermined number of keys, said generate a reserved shard list and said store the reserved shard list.

18. The non-transitory computer readable storage medium of claim 17, wherein to select one of the plurality of shards the program instructions further cause the computer to:
determine whether a reserved shard list is associated with the key;
in response to determining that a reserved shard list is associated with the key,
select a reserved shard in the order indicated by the reserved shard list as the selected shard.

19. The non-transitory computer readable storage medium of claim 18, wherein the program instructions further cause the computer to:
in response to a determination that the reserved shard list for the key is exhausted after said repeating one or more times,
apply a key chaining technique or a shard chaining technique to determine the shard order and continue said repeating.

20. The non-transitory computer readable storage medium of claim 14, wherein to determine whether the workload of the selected shard exceeds the workload threshold, the program instructions further cause the computer to determine the workload of the selected shard based on a throttling response of the selected shard that indicates the workload or based on a queuing parameter of the selected shard that indicates the workload.

21. The non-transitory computer readable storage medium of claim 14, wherein the program instructions further cause the computer to:
determine the workload for the selected shard based on a workload heat map storing at least binary values for the shards indicating whether or not the workload for the corresponding shard exceeds the workload threshold.

* * * * *